July 29, 1924.
H. R. CURME
1,502,941
PROCESS OF OXIDIZING DIBENZYL
Filed May 4, 1922
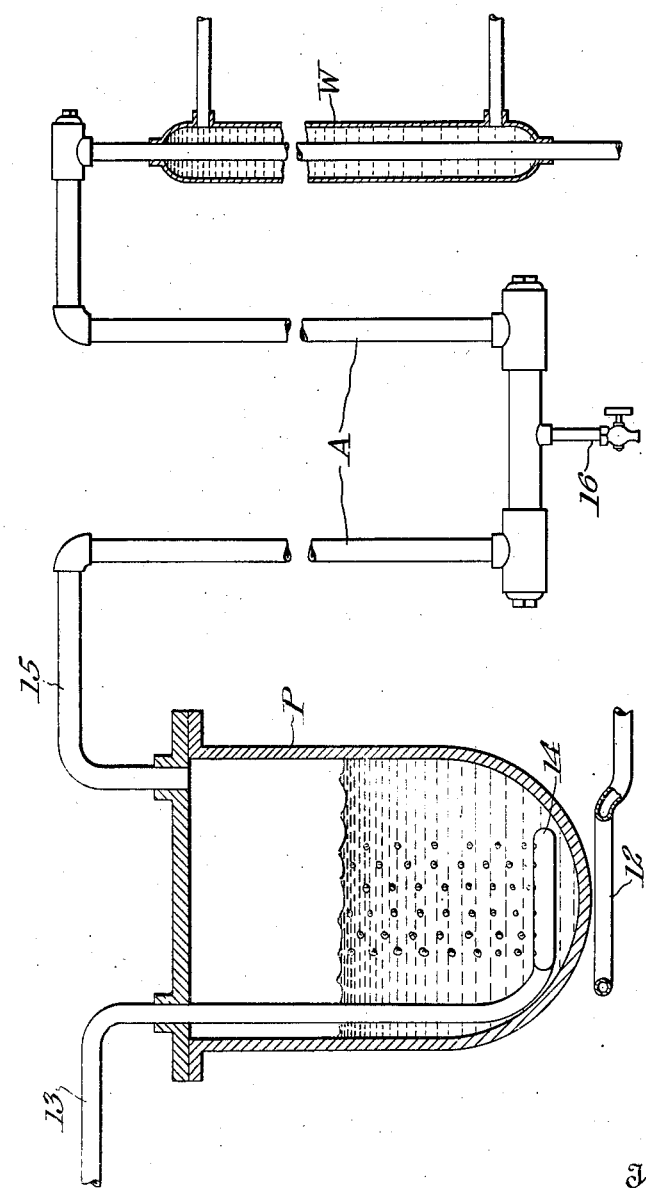
Inventor:
Henry R. Curme,
by Byrnes, Townsend & Brickenstein
Attorneys.

Patented July 29, 1924.

UNITED STATES PATENT OFFICE.

HENRY R. CURME, OF CLENDENIN, WEST VIRGINIA, ASSIGNOR TO CARBIDE AND CARBON CHEMICALS CORPORATION, A CORPORATION OF NEW YORK.

PROCESS OF OXIDIZING DIBENZYL.

Application filed May 4, 1922. Serial No. 558,533.

*To all whom it may concern:*

Be it known that I, HENRY R. CURME, a citizen of the United States, residing at Clendenin, in the county of Kanawha and State of West Virginia, have invented certain new and useful Improvements in Processes of Oxidizing Dibenzyl, of which the following is a specification.

Prior to the invention of George O. Curme, Jr. and Herman B. Heyn, described and claimed in copending application Serial No. 163,522, filed April 20, 1917, it was believed that it was impossible to oxidize dibenzyl to any oxygenated aromatic compound except by the use of strongly oxidizing compounds, such as permanganates and chromic acid.

In the application referred to, it was shown that oxidation of dibenzyl might be brought about through the agency of molecular oxygen, but only in the presence of an oxygen carrier, that is, a substance which appears to have the power to combine with the molecular oxygen and immediately release it in a more active form, such as nascent or atomic oxygen.

In each of the processes referred to, benzoic acid (or its salts) was the only oxygenated aromatic compound observed in quantity in the reaction products.

I have now discovered that the oxidation of dibenzyl may be successfully brought about with molecular oxygen, without the intervention of any oxygen carrier. By proceeding in this way, I find that not only benzoic acid but also benzaldehyde is produced, and the oxygenated compounds may be recovered in such form that their purification is a very simple matter.

My process is carried out by merely bringing molecular oxygen into intimate contact with the dibenzyl. The oxygen may be in dilute form, such as air or other oxygen-bearing mixture, or it may be applied in highly concentrated form, such as commercial oxygen, or pure oxygen.

An embodiment of my invention will now be described in connection with the accompanying drawing, which is largely diagrammatic, and which shows one of many forms of apparatus suitable for carrying out the process.

The dibenzyl to be oxidized is placed in the covered vessel P provided with heating means 12. The oxygen-bearing gas is introduced through pipe 13 and carried to the perforated ring 14, from which it is expelled into the liquid.

The steam produced in the reaction, any oxygen not consumed, the gases associated with the oxygen in the mixture introduced, and more or less of the oxygenated aromatic compounds formed during the reaction, will pass off through outlet-pipe 15 to the air-cooled condenser A, where the bulk of the condensible constituents of the mixture will be liquefied. These may be withdrawn from time to time or continuously through outlet 16.

In order to avoid loss of condensible products, the gas current is passed from the condenser A to a water-cooled condenser W, where more liquid may be condensed and collected. A scrubber wherein the exit gases may be scrubbed with a suitable liquid may be substituted for the condenser W or used in conjunction with one or more condensers.

The reaction proceeds very slowly at low temperatures and a temperature not much below 150° C. is therefore preferred. Dibenzyl boils at about 284° C., and with an apparatus of the kind illustrated and operating at barometric pressure, this temperature should not be exceeded. It is possible, however, by increasing the pressure in the reaction vessel, to operate at higher temperatures than 284° C. While I prefer to treat the dibenzyl in liquid phase, a process employing the vapor phase of dibenzyl is not precluded.

The process gives a high yield of benzaldehyde or benzoic acid or a mixture of these compounds. A little of the dibenzyl is in some cases converted into other products, as yet unidentified.

Since benzaldehyde boils at 179° C. and benzoic acid at 250° C., it is preferred to operate at such temperatures that these compounds will pass over with the gas current, and thus be separated from the higher-boiling dibenzyl. A little dibenzyl may also be carried off by the gas current, but this condenses and is easily separated from the desired products.

The process is adapted for continuous operation, dibenzyl being fed to the reaction vessel continuously or at intervals, and the system relieved of undesired substances, when necessary, by drawing off small quantities of material from the reaction vessel.

An apparatus in which a series of reaction vessels are arranged in cascade is also adapted for continuous operation.

I claim:—

1. Process of oxidizing dibenzyl which comprises passing a gas current bearing molecular oxygen into intimate contact with the dibenzyl in the absence of an oxygen carrier and under such conditions that oxygenated aromatic compounds are formed and carried over by the gas current; and recovering the oxygenated compounds from the gas current.

2. Process of oxidizing dibenzyl which comprises passing a gas current bearing molecular oxygen into intimate contact with the dibenzyl in the absence of an oxygen carrier and at a temperature between 150° C. and 284° C., whereby oxygenated aromatic compounds are formed and carried over by the gas current; and recovering the oxygenated compounds from the gas current.

3. Process of oxidizing dibenzyl which comprises bringing molecular oxygen into intimate contact with the dibenzyl under such conditions that the oxygen acts directly thereon, producing oxygenated aromatic compounds; and recovering the oxygenated compounds so formed.

4. Process of oxidizing dibenzyl which comprises bringing molecular oxygen into intimate contact with the dibenzyl at a temperature between 150° C. and 284° C., whereby the oxygen acts directly on the dibenzyl with the formation of oxygenated aromatic compounds; and recovering the oxygenated compounds so formed.

In testimony whereof, I affix my signature.

HENRY R. CURME.